(12) United States Patent
Tatsumi et al.

(10) Patent No.: US 7,504,180 B2
(45) Date of Patent: Mar. 17, 2009

(54) POSITIVE ELECTRODE MATERIAL FOR LITHIUM SECONDARY BATTERY AND PROCESS FOR PRODUCING THE SAME

(75) Inventors: Koji Tatsumi, Chigasaki (JP); Manabu Suhara, Chigasaki (JP); Naoshi Saito, Chigasaki (JP); Kazushige Horichi, Chigasaki (JP); Yukio Jitsugiri, Chigasaki (JP)

(73) Assignee: Seimi Chemical Co., Ltd., Chigasaki-shi, Kanagawa-ken (JP)

( * ) Notice: Subject to any disclaimer, the term of this patent is extended or adjusted under 35 U.S.C. 154(b) by 195 days.

(21) Appl. No.: 10/526,474

(22) PCT Filed: Jun. 6, 2003

(86) PCT No.: PCT/JP03/07223

§ 371 (c)(1),
(2), (4) Date: Mar. 3, 2005

(87) PCT Pub. No.: WO2004/030126

PCT Pub. Date: Apr. 8, 2004

(65) Prior Publication Data

US 2005/0250013 A1 Nov. 10, 2005

(30) Foreign Application Priority Data

Sep. 25, 2002 (JP) ............................. 2002-279198

(51) Int. Cl.
*H01M 4/58* (2006.01)
(52) U.S. Cl. .............................. 429/231.95; 429/231.3; 429/231.6; 429/323
(58) Field of Classification Search ................. 429/319, 429/231.95, 323, 322
See application file for complete search history.

(56) References Cited

U.S. PATENT DOCUMENTS

| 6,071,645 | A  | * | 6/2000  | Biensan et al. | ............... 429/223 |
| 6,805,996 | B2 | * | 10/2004 | Hosoya | ........................ 429/94 |
| 2002/0086210 | A1 | * | 7/2002 | Naruoka et al. | ............. 429/223 |

* cited by examiner

*Primary Examiner*—Patrick Ryan
*Assistant Examiner*—Ben Lewis
(74) *Attorney, Agent, or Firm*—Manabu Kanesaka

(57) ABSTRACT

There is obtained a material of a positive electrode for a secondary lithium-ion cell having high cycle durability and high safety in high-voltage and high-capacity applications, which is a particulate positive electrode active material for a secondary lithium-ion cell represented by a general formula, $Li_aCO_bA_cB_dO_eF_f$ (A is Al or Mg, B is a group-IV transition element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$, and $0.0001 \leq c+d \leq 0.03$), where element A, element B and fluorine are evenly present in the vicinity of the particle surfaces.

4 Claims, 2 Drawing Sheets

_US 7,504,180 B2_

POSITIVE ELECTRODE MATERIAL FOR LITHIUM SECONDARY BATTERY AND PROCESS FOR PRODUCING THE SAME

RELATED APPLICATIONS

The present application is based on International Application No. PCT/JP2003/007223, filed Jun. 6, 2003, and claims priority from, Japan Application Number 2002-279198, filed Sep. 25, 2002, the disclosure of which is hereby incorporated by reference herein in its entirety.

TECHNICAL FIELD

The present invention relates to positive electrode material for a secondary lithium cell that has a large capacity and excellent cycle characteristics, particularly under high voltages, and a method for manufacturing the same.

BACKGROUND ART

In recent years, with increase in the production of portable and cordless equipment, demands for small and light non-aqueous electrolyte secondary cells having a high energy density have increased, and development for non-aqueous electrolyte secondary cells having excellent characteristics have been desired much more than before.

As a positive electrode material for non-aqueous electrolyte secondary cells, $LiCoO_2$, $LiNiO_2$, $LiMn_2O_4$ and the like are used, and particularly, a large quantity of $LiCoO_2$ is used from the aspect of safety, capacity and the like. In this material, since lithium in the crystal lattice escapes into the electrolyte as lithium ions when charged, and the lithium ions are inserted into the crystal lattice from the electrolyte when discharged, the material manifests the function as the positive electrode active material.

Theoretically, one lithium atom can be released from or inserted into one $LiCoO_2$ lattice. However, if the majority of lithium are released or inserted, $LiCoO_2$ is violently deteriorated, and especially cycle properties are significantly damaged. Therefore, in the present state, only about 0.55 lithium is released from or inserted into one $LiCoO_2$, and a capacity of only about 150 mAh is used for 1 g of $LiCoO_2$.

Although increase in the capacity is expected by releasing and inserting a larger quantity of lithium atoms, if lithium are released or inserted in present quantities or more, the violent deterioration of $LiCoO_2$ occurs due to the phase transition of the $LiCoO_2$ crystal lattice, accompanying damage of particles and the crystal lattice, and the elution of cobalt ions from the crystal lattice, causing a problem of difficulty to secure satisfactory cycle properties.

Although there are approaches to improve the cycle durability at 4.5 V by doping 5% by weight of zirconium into $LiCoO_2$, the initial capacity lowers significantly, and cycle durability is also unsatisfactory (refer to Z. Chen and J. R. Dahn, 11th International Meeting of Lithium Battery, Jun. 23-28, 2002, Monterey, USA, Abstract No. 266).

Therefore, the object of the present invention is to provide a positive electrode active material for a high-capacity and highly safe lithium ion secondary cell for high voltage that excels in prevention of deterioration at high voltage, and excels in cycle durability.

DISCLOSURE OF THE INVENTION

In order to achieve the above object, the present inventors diligently conducted repetitive studies, and found that a secondary lithium cell has good cycle characteristics even in a high-voltage region conventionally said to be overcharging, by simultaneously adding a specific quantity of a plurality of specific metal elements to a lithium cobaltate-based particulate positive electrode active material for secondary lithium cells, or further simultaneously adding fluorine.

In the present invention, high voltage means a voltage wherein charge voltage is 4.4 V or higher on the basis of a lithium electrode. Furthermore, as a specific charge voltage, 4.5 V is exemplified. At this time, a capacity of about 185 to 190 mAh can be used for 1 g of $LiCoO_2$, which corresponds to the deintercalation of about 0.7 lithium atom for one $LiCoO_2$.

In the present invention, although the reason why good cycle properties can be obtained in the high-voltage region is not quite clear, it is considered that under a high-voltage condition wherein a majority of lithium ions are extracted, the specific metal elements, which are simultaneously added, and present on the surface of the particles or partially dissolved on the surfaces of particles, may act as the pillars of the crystal lattice to reduce the strain of the crystal lattice caused by phase transition or expansion/contraction, thereby suppressing its deterioration. At the same time, since the chance wherein cobalt atoms directly contact the electrolyte is reduced, and no overcharged states occur locally in the particles, it is considered that deterioration is suppressed.

Thus, the positive electrode material for secondary lithium-ion cells of the present invention is a material of a positive electrode for a secondary lithium cell characterized in being a particulate positive electrode active material for a secondary lithium cell represented by a general formula, $Li_aCo_bA_cB_dO_eF_f$ (A is Al or Mg, B is a group-IV transition element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$, and $0.0001 \leq c+d \leq 0.03$); and that element A, element B and fluorine are evenly present in the vicinity of the particle surfaces.

In the present invention, "evenly present" means not only the case wherein each of the above-described elements is substantially evenly present in the vicinity of the particle surfaces, but also the case where the quantity of each of the above-described elements presents between particles of substantially the same; and it is sufficient if either one is satisfied, especially, it is preferable that the both are satisfied. Specifically, it is particularly preferable that the quantity of each of the above-described elements is substantially the same, and each of the above-described elements is evenly present on the surface of a particle.

In the present invention, it is preferable that at least a part of the element represented by A or B contained in the particulate positive electrode active material for a secondary lithium-ion cell substitutes for cobalt atoms in the particles to form a solid solution. The preferable atomic ratio of the element A to the element B is $0.33 \leq c/d \leq 3.00$ and $0.002 \leq c+d \leq 0.02$.

In the present invention, although the element A is either aluminum or magnesium, and the element B is selected from group-IV transition elements, it is preferable that the element A is magnesium. When the element A is magnesium, it is considered that magnesium substitutes mainly the lithium site. It is also preferable that the element B is zirconium.

The present invention also provides a material of a positive electrode for a secondary lithium cell characterized in that no diffraction peaks are observed at $2\theta$ of $28\pm1°$ in a high-sensitivity X-ray diffraction spectrum using Cu—K α ray.

In the present invention, the high-sensitivity X-ray diffraction spectrum means a diffraction spectrum obtained when the accelerating voltage of the X-ray tube is 50 kV, and the accelerating current is 250 mA. The ordinary X-ray diffraction spectrum uses an accelerating voltage of 40 kV and an accelerating current of about 40 mA, and this is difficult to detect a trace of the impurity phase noted in the present invention, and significantly affecting the cell performance while suppressing analysis noise at a high accuracy in a short time.

For example, when the element B is zirconium, the bonding state of cobalt atoms, lithium atoms and oxygen atoms can be determined by high-sensitivity X-ray diffraction spectrum. When the element B is zirconium, and forms a solid solution with cobalt atoms, no diffraction spectra derived from a single-component oxide of zirconium ($ZrO_2$) are observed, and only the spectrum of $Li_2ZrO_3$ is partly observed. The spectrum intensity of $Li_2ZrO_3$ is affected by the feeding mole ratio of zirconium to the element A, the firing method or the like.

Specifically, if the element B does not form a solid solution with cobalt atoms, diffraction spectra derived from a single-component oxide of the element B are significantly observed. From the diffraction spectrum intensity of the single-component oxide of the element B, the quantity of the element B in the solid solution can be observed. The element B occupies the cobalt site substitutionally to form a solid solution, and the extent of solid solution is preferably 60% or more, and more preferably 75% or more.

The present inventors found that the cell performance was improved if the quantity of the element B as the single-component oxide was small. Therefore, the present invention provides a material of a positive electrode for a secondary lithium cell, characterized in that the abundance of the single-component oxide of the element B is 20% or less.

The abundance of the single-component oxide of the element B exceeding 20% is not preferable, because the effect of improving charge-discharge cycle durability at high voltages lowers. The abundance of the single-component oxide of the element B is particularly preferably 10% or less.

Particularly, the present inventors selected zirconium as the element B, selected magnesium as the element A, and found that the material for the positive electrode having a specific structure obtained by manufacturing using a specific method by coexisting these has significantly improved charge-discharge cycle durability at high voltages.

Here, it is important that in the specific structure, specifically, added zirconium is not present as a single-component oxide on the surface of lithium cobaltate particles; and for that, the present inventors found that it was particularly preferable to add magnesium to zirconium in the above-described specific atomic ratio ($0.33 \leq c/d \leq 3.00$ and $0.002 \leq c+d \leq 0.02$), and lithium cobaltate was formed in the coexistence of a zirconium compound and a magnesium compound. In other words, the present inventors found that the coexistence of magnesium had the significant effect to raise the reactivity of zirconium. It was also known that the existence of magnesium had the effect to lower the $Co_3O_4$ content in formed lithium cobaltate.

Although the action mechanism wherein unique property improvement can be achieved by the simultaneous addition of zirconium and magnesium has not been clarified, it is estimated that an inactive film is evenly formed on the surfaces of lithium cobaltate particles by the simultaneous addition of zirconium and magnesium, and crystal disintegration of the crystal structure of lithium cobaltate from particle surfaces caused by charge and discharge can be suppressed.

In the present invention, although unique property improvement observed by the simultaneous addition of zirconium and magnesium has been disclosed, the combination of such elements is not limited to this combination, but the combination of the element A for raising the reactivity of the element B can be selected so that the added element B is not present as a single-component oxide. As the element A, especially magnesium is preferably adopted as described above.

The present invention is also characterized in that the particulate positive electrode active material for a secondary lithium cell consists of particles wherein 10 or more primary particles are coagulated to form a secondary particle, and the average particle diameter of the secondary particle is 2 to 20 µm. By such a secondary particle structure of coagulated bodies, the improvement of the packed density of the active material of the electrode layer, and the improvement of large-current charge-discharge properties can be achieved.

As a preferable method for manufacturing a material of a positive electrode for a secondary lithium-ion cell characterized in being a particulate positive electrode active material for a secondary lithium cell represented by a general formula, $Li_aCo_bA_cB_dO_eF_f$ (A is Al or Mg, B is a group-IV transition element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$, and $0.0001 \leq c+d \leq 0.03$); and that element A, element B and fluorine are evenly present in the vicinity of the particle surfaces, the present invention provides a method for manufacturing a material of a positive electrode for a secondary lithium cell that consists of particles wherein 10 or more primary particles are coagulated to form a secondary particle, characterized in that a cobalt material containing at least either cobalt oxyhydroxide or cobalt hydroxide, lithium carbonate, and the element A and the element B are mixed and fired.

BEST MODE FOR CARRYING OUT THE INVENTION

Figure 1:
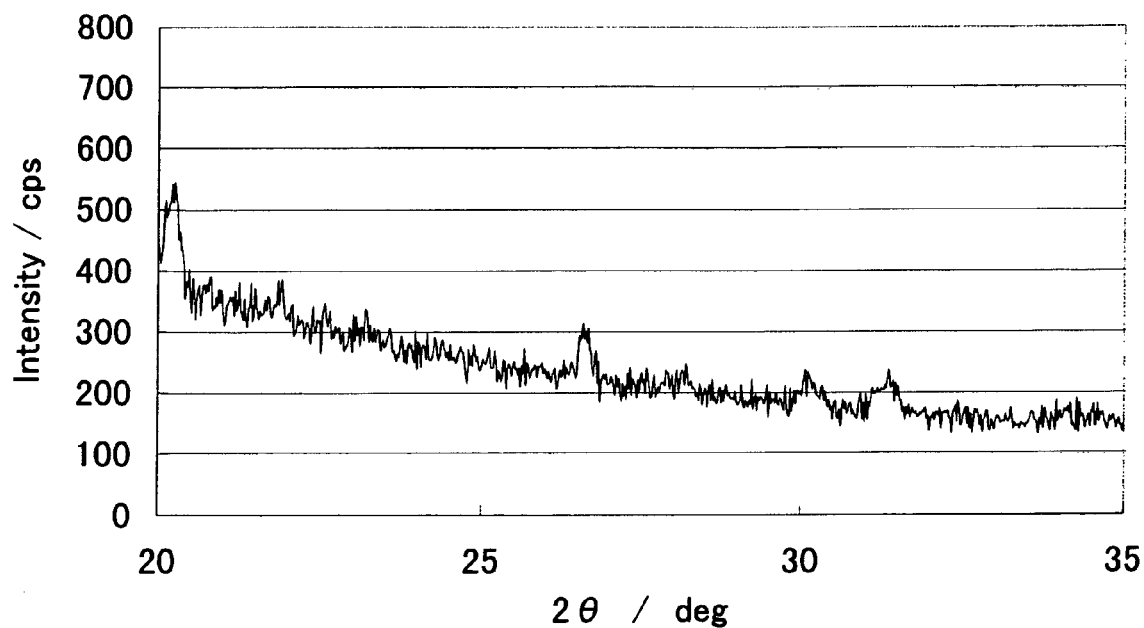
FIG. 1 is a graph showing an X-ray powder diffraction spectrum of the positive electrode active material obtained in Example 2.

As described above, the particulate positive electrode active material for a secondary lithium cell of the present invention has a general formula, $Li_aCo_bA_cB_dO_eF_f$. In this general formula, it is preferable that a is 0.90 to 1.10, b is 0.97 to 1.00, c is 0.0001 to 0.03, d is 0.0001 to 0.03, e is 1.98 to 2.02, f is 0 to 0.02, and c+d is 0.0001 to 0.03.

The element A is preferably Al or Mg and the element B is preferably at least one element that belongs to the group IV of the periodic table. As the group-IV of the periodic table, Ti, Zr and Hf are exemplified.

The positive electrode active material for a secondary lithium cell of the present invention is preferably spherical and particulate, and the average particle diameter thereof is preferably 2 to 20 µm, more preferably 3 to 15 µm.

If the average particle diameter is smaller than 2 µm, it is difficult to form a dense electrode layer; on the contrary, if the average particle diameter exceeds 20 µm, it is difficult to form a flat surface of the electrode layer.

The positive electrode active material is preferably a particulate material wherein 10 or more primary particles of fine particles coagulate to form a secondary particle. Thereby the packed density of the active material of the electrode layer can be improved, and the improvement of large-current charge-discharge properties can be achieved.

In the particulate positive electrode active material of the present invention, the element A or B, or F must be substantially evenly present on the surfaces of particles thereof. In other words, the element A or B, or F must not be substantially present in the particles. In such a case, since the element A or B, or F is present on the surface of the positive electrode active material, the effect can be obtained by adding a small quantity. If the element A or B, or F is present in the particles, the effect of the present invention cannot be obtained.

When the element A or B, or F is added in the particles in order to obtain the effect of the present invention, that is, the high capacity and high cycle properties, under the use of high voltage as the positive electrode active material, the addition of a large quantity of the element A or B, or F is required.

However, since the addition of a large quantity of the element A or B, or F rather causes the lowering of initial capacitance, and the lowering of large-current discharge properties, it is desired to add a small quantity of the element A or B, or F, and to make them present only on the surface. Among them, the elements A and B are preferably present within 100 nm, more preferably within 30 nm from the particle surface.

A part of the elements A and B present on the particle surface of the positive electrode active material is preferably a solid solution that substitutes cobalt atoms in the particles. Also a part of fluorine atoms preferably substitutes for oxygen atoms in the particles to form a solid solution.

In such a case, since no cobalt or oxygen atoms are exposed on the particle surface of the positive electrode active material, the effect of the added elements is more preferably obtained. As a result, the cycle properties as the positive electrode active material for high voltage uses are effectively improved. The addition of fluorine atoms is preferable because it has the effect of improving the safety and the cycle properties of the cell.

It has been known that the atomic ratios of element-A atoms and element-B atoms to cobalt atoms contained in the particulate positive electrode active material of the present invention (c/b and d/b) must be 0.0001 to 0.02, respectively, these must be simultaneously added, and the atomic ratio of the total quantity of element-A atoms and element-B atoms to cobalt atoms ((c+d)/b) must be 0.0001 to 0.02.

The element-A atomic ratio and the element-B atomic ratio smaller than 0.0001, respectively, are not preferable, because the improving effect related to high cycle properties is reduced. On the other hand, the atomic ratio of the total quantity of element-A atoms and element-B atoms exceeding 0.02 is not preferable, because the initial capacity is significantly lowered.

The atomic ratios of fluorine atoms and cobalt atoms are preferably 0.0001 to 0.02, and more preferably 0.0005 to 0.008, for improving safety and cycle properties. The atomic ratio of fluorine exceeding this value is not preferable, because the discharge capacity is significantly lowered.

Furthermore, it is preferable that the particulate positive electrode active material of the present invention has a press density of 2.7 to 3.3 g/cm$^3$. If the press density is lower than 2.7 g/cm$^3$, it is not preferable because the initial volume capacity density of the positive electrode when the positive electrode sheet is formed using the particulate positive electrode active material is lowered, and on the contrary, if the press density is higher than 3.3 g/cm$^3$, it is not preferable because the initial weight capacity density of the positive electrode is lowered, or the high-rate discharge property is lowered. Above all, the press density of the particulate positive electrode active material is preferably 2.9 to 3.2 g/cm$^3$.

In the present invention, it is preferable to use substantially spherical cobalt oxyhydroxide wherein a large number of primary particles are coagulated to form a secondary particle as the cobalt material, because the press density can be high. Here, the press density means a numerical value obtained from the volume and powder weight when the powder is compressed under a pressure of 0.32 t/cm$^2$.

In addition, the specific surface area of the particulate positive electrode active material of the present invention is preferably 0.2 to 1 m$^2$/g. If the specific surface is smaller than 0.2 m$^2$/g, the discharge capacity per initial unit weight is lowered; on the contrary, if the specific surface exceeds than 1 m$^2$/g, the discharge capacity per initial unit volume is also lowered, and the excellent positive electrode active material of the object of the present invention cannot be obtained. The specific surface area is more preferably 0.3 to 0.7 m$^2$/g.

The method for manufacturing the particulate positive electrode active material of the present invention is not specifically limited, but methods well known to the art can be used for manufacturing. For example, as the cobalt material, cobalt hydroxide, tricobalt tetroxide, and cobalt oxyhydroxide; especially, cobalt oxyhydroxide and cobalt hydroxide, which can exert high cell performance, are preferable. Also as the cobalt material, the cobalt material consisting of particles wherein 10 or more primary particles are coagulated to form a secondary particle, and containing at least either cobalt oxyhydroxide or cobalt hydroxide is preferable, because high cell performance can be attained.

As sources for the elements A and B, oxide, hydroxides, chlorides, nitrates, organic acid salts, oxyhydroxides, and fluorides are used; especially, hydroxides and fluorides, which can exert high cell performance, are preferable. As a source for lithium, lithium carbonate and lithium hydroxide are preferable. Also as a source for fluorine, lithium fluoride, aluminum fluoride, and magnesium fluoride are preferable.

A mixture of these source materials, preferably a mixture of at least one selected from an oxide containing the element A or B and a hydroxide containing the element A or B, lithium fluoride, cobalt hydroxide, cobalt oxyhydroxide or cobalt oxide, and lithium carbonate is fired in an oxygen-containing atmosphere at 600 to 1050° C., preferably at 850 to 1000° C. for preferably 4 to 48 hours, more preferably for 8 to 20 hours to convert to a composite oxide. If a fluoride containing the element A or B is used in lieu of the compound containing the element A or B and lithium fluoride, good cell performance can be obtained.

As the oxygen-containing atmosphere, the use of an oxygen-containing atmosphere containing 10% by volume or more, especially 40% by volume or more oxygen is preferable. Such a composite oxide can satisfy the present invention by varying the kind of each material, mixed composition and firing conditions. Also in the present invention, preliminary firing can be performed before the above-described firing. It is preferable that preliminary firing is performed in an oxidizing atmosphere, at preferably 450 to 550° C. for preferably 4 to 20 hours.

The manufacture of the positive electrode active material of the present invention is not necessarily limited to the above-described method, but it can be manufactured by synthesizing a positive electrode active material using, for example a metal fluoride, an oxide and/or a hydroxide as materials, and further performing surface treatment using a fluorinating agent such as fluorine gas, NF$_3$ and HF.

In manufacturing a material of a positive electrode for a secondary lithium-ion cell, which is a particulate positive electrode active material for a secondary lithium cell represented by a general formula, $Li_aCo_bA_cB_dO_eF_f$ (A is Al or Mg, B is a group-IV transition element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 \leq f \leq 0.02$, and $0.0001 \leq c+d \leq 0.03$); and that element A, element B and fluorine are evenly present in the vicinity of the particle surfaces, the present invention also provides a method for manufacturing a material of a positive electrode for a secondary lithium cell that consists of particles wherein 10 or more primary particles are coagulated to form a secondary particle, characterized in that a cobalt material containing at least either cobalt oxyhydroxide or cobalt hydroxide, lithium carbonate, and said element A and element B are mixed and fired.

The method for obtaining the positive electrode for a secondary lithium cell from the particulate positive electrode active material of the present invention can be carried out according to the usual manner. For example, by mixing a carbon-based conductive material, such as acetylene black, graphite, and kitchen black, and a binder to the powder of the positive electrode active material of the present invention, a positive electrode mixture is formed. As the binder, polyvinylidene fluoride, polytetrafluoroethylene, polyamide, carboxymethyl cellulose, acrylic resins or the like is used.

A slurry formed by dispersing the above-described positive electrode mixture in a dispersant such as N-methyl pyrrolidone is applied to a positive electrode collector, such as an aluminum foil, dried and press-rolled to form a positive electrode active material layer on the positive electrode collector.

In a lithium cell using the positive electrode active material of the present invention as the positive electrode, the solvent of the electrolyte solution is preferably a carbonate ester. Both cyclic and chain carbonate esters can be used. As cyclic carbonate esters, propylene carbonate, ethylene carbonate (EC) and the like are exemplified. As chain carbonate esters, dimethyl carbonate, diethyl carbonate (DEC), ethyl methyl carbonate, methyl propyl carbonate, methyl isopropyl carbonate and the like are exemplified.

The above-described carbonate esters can be used alone, or by mixing two or more. They can also be used by mixing to other solvents. Depending on the material of the negative electrode active material, the concomitant use of a chain ester carbonate and a cyclic ester carbonate may improve the discharge properties, cycle durability, charge-discharge efficiency or the like.

A gel polymer electrolyte formed by adding a vinylidene fluoride-hexafluoropropylene copolymer (e.g., Kynar manufactured by Atochem), and a vinylidene fluoride-perfluoropropyl vinyl ether copolymer to these organic solvents, and adding a solute described below can also be used.

As the solute of the electrolyte solution, it is preferable to use either one or more lithium salt containing $ClO_4-$, $CF_3SO_3-$, $BF_4-$, $PF_6-$, $AsF_6-$, $SbF_6-$, $CF_3CO_2-$, $(CF_3SO_2)_2N-$ or the like as anions. The above-described electrolyte solutions or polymer electrolytes are preferably formed by adding an electrolyte consisting of a lithium salt to the above-described solvent or solvent-containing polymer at a concentration of 0.2 to 2.0 mol/L. If the concentration is beyond this range, the ionic conductivity lowers, and the electric conductivity of the electrolyte lowers. More preferably, 0.5 to 1.5 mol/L is selected. For the separator, a porous polyethylene or porous polypropylene film is used.

The negative electrode active material of the lithium cell using the positive electrode active material of the present invention as the positive electrode is a material that can occlude and release lithium ions. Although the material forming the negative electrode active material is not specifically limited, for example, lithium metal, lithium alloys, carbon materials, oxides based on the metals in groups 14 and 15 of the periodic table, carbon compounds, silicon carbide compounds, silicon oxide compounds, titanium sulfide, boron carbide compound and the like can be listed.

As carbon compounds, organic materials thermally decomposed under various conditions, artificial graphite, natural graphite, soil graphite, expanded graphite, scale-like graphite or the like can be used. As oxides, compounds based on tin oxide can be used. As the negative electrode collector, copper foil, nickel foil or the like can be used.

The shape of the secondary lithium cell using the positive electrode active material of the present invention is not specifically limited. A sheet shape (i.e., film shape), folded shape, winding cylindrical shape with a bottom, button shape or the like is selected depending on the use.

EXAMPLES

Next, the specific examples 1 to 11, and the comparative examples thereof 1 to 8 will be described below.

Example 1

Predetermined quantities of cobalt oxyhydroxide powder having an average particle diameter D50 of 10.2 µm, wherein 50 or more primary particles were coagulated to form a secondary particle, lithium carbonate powder, aluminum hydroxide powder, and zirconium oxide power were mixed. These four kinds of powders were dry-mixed, and then, fired at 950° C. for 14 hours in the atmosphere. As a result of wet-dissolving the powder after firing, and measuring the content of cobalt, aluminum, zirconium and lithium by ICP and atomic absorption spectrometry, the composition of the powder was $LiCo_{0.99}Al_{0.005}Zr_{0.005}O_2$.

The specific surface area of the powder after firing (positive electrode active material powder) measured using the nitrogen adsorption method of the powder was 0.37 $m^2$/g, and the average particle diameter D50 measured using a laser scattering type particle-size distribution analyzer was 11.8 µm. As a result of XPS analysis of the powder surface after firing, a strong signal of Al2P caused by aluminum and a strong signal of Zr3P caused by zirconium were detected.

After the powder was sputtered for 10 minutes, XPS analysis was conducted. The signals of aluminum and zirconium by XPS were attenuated to 10% and 13% the signals before sputtering, respectively. The sputtering is equivalent to surface etching to a depth of about 30 nm. It was known therefrom that aluminum and zirconium were present on the surfaces of the particles. Furthermore, as a result of observation using an SEM (scanning electron microscope), the obtained positive electrode active material formed secondary particles wherein 30 or more primary particles were coagulated.

The $LiCo_{0.99}Al_{0.005}Zr_{0.005}O_2$ powder thus obtained, acetylene black, and polytetrafluoroethylene powder were mixed in a weight ratio of 80/16/4, kneaded while adding toluene, and dried to fabricate a positive electrode plate of a thickness of 150 µm.

Then, using an aluminum foil of a thickness of 20 µm as a positive electrode collector, using porous polypropylene of a thickness of 25 µm as a separator, using a metallic lithium foil of a thickness of 500 µm as a negative electrode, using a nickel foil of 20 µm as a negative electrode collector, and using 1M $LiPF_6$/EC+DEC (1:1) as an electrolyte, a simple sealed cell made of stainless steel was assembled in an argon glove box.

The cell was first charged to 4.5 V using a load current of 75 mA for 1 g of the positive electrode active material at 25° C., and discharged to 2.75 V using a load current of 75 mA for 1 g of the positive electrode active material to obtain the initial discharge capacity. Furthermore, 50 times of charge-discharge cycle tests were conducted.

The initial discharge capacity at 25° C. 2.75 to 4.5 V, and a discharge rate of 0.5 C was 186.4 mAh/g, and the average voltage was 4.019 V. The capacity retention after 50 times of charge-discharge cycles was 86.9%.

Another cell of the same type was fabricated. This cell was charged at 4.3 V for 10 hours, and disassembled in an argon glove box. The positive electrode body sheet after charging was removed, and after washing the positive electrode body sheet, it was punched into a diameter of 3 mm, sealed in an aluminum capsule together with EC, and the temperature was raised at a rate of 5° C./min using a scanning differential calorimeter to measure the heat-generation starting temperature.

As a result thereof, the heat-generation starting temperature of the 4.3-V charged material was 166° C.

Example 2

A positive electrode active material was synthesized in the same manner as in Example 1 except that magnesium hydroxide was used in lieu of using aluminum hydroxide, and composition analyses, property measurements, and cell performance tests were carried out. As a result thereof, the composition was $LiCo_{0.99}Mg_{0.005}Zr_{0.005}O_2$.

The specific surface area of the powder after firing measured using the nitrogen adsorption method of the powder was 0.32 m$^2$/g, and the average particle diameter D50 measured using a laser scattering type particle-size distribution analyzer was 12.5 μm. Magnesium and zirconium were present on the surface. The initial discharge capacity at 25° C., 2.75 to 4.5 V, and a discharge rate of 0.5 C was 192.0 mAh/g, and the average voltage was 4.009 V. The capacity retention after 50 times of charge-discharge cycles was 92.0%.

The X-ray diffraction spectrum of the fired powder was obtained by a high-sensitivity X-ray diffractometry using Cu—K α ray, using a Model RINT2500 X-ray diffractometer manufactured by Rigaku Corporation under the conditions of an accelerating voltage of 50 kV, an accelerating current of 250 mA, a scanning speed of 1°/min, a step angle of 0.02°, a divergence slit of 1°, a scattering slit of 1°, a receiving slit of 0.3 mm, and monochromatization. The obtained spectrum is shown in FIG. 1. From FIG. 1, no diffraction spectrum at 2 θ of 28±1° was observed, and it was found that zirconium was not present as a single-component oxide.

It was also found from the analysis of the X-ray diffraction spectrum that about 90% of the zirconium formed a solid solution with cobalt, and about 10% thereof was present as $Li_2ZrO_3$. As a result of observation through SEM, 30 or more primary particles were coagulated to form a secondary particle in the obtained positive electrode active material powder.

Example 3

A positive electrode active material was synthesized in the same manner as in Example 1 except that predetermined quantities of cobalt oxyhydroxide powder having an average particle diameter D50 of 10.7 μm wherein 50 or more primary particles were coagulated to form a secondary particle, lithium carbonate powder, aluminum hydroxide powder, zirconium oxide powder, and lithium fluoride powder were mixed; and composition analyses, property measurements, and cell performance tests were carried out. As a result thereof, the composition was $LiCo_{0.99}Al_{0.005}Zr_{0.005}O_{1.9924}F_{0.0076}$.

The specific surface area of the powder after firing measured using the nitrogen adsorption method of the powder was 0.34 m$^2$/g, and the average particle diameter D50 measured using a laser scattering type particle-size distribution analyzer was 12.8 μm. Aluminum, zirconium and fluorine were present on the surface. As a result of observation through SEM, 30 or more primary particles were coagulated to form a secondary particle in the obtained positive electrode active material powder.

The initial discharge capacity at 25° C., 2.75 to 4.5 V, and a discharge rate of 0.5 C was 185.6 mAh/g, and the average voltage was 4.02 V. The capacity retention after 50 times of charge-discharge cycles was 88.0%. The heat-generation starting temperature of the 4.3-V charged material was 173° C.

Example 4

A positive electrode active material was synthesized in the same manner as in Example 1 except that predetermined quantities of cobalt oxyhydroxide powder having an average particle diameter D50 of 10.7 μm wherein 50 or more primary particles were coagulated to form a secondary particle, lithium carbonate powder, magnesium hydroxide powder, zirconium oxide powder, and lithium fluoride powder were mixed; and composition analyses, property measurements, and cell performance tests were carried out. As a result thereof, the composition was $LiCo_{0.99}Mg_{0.005}Zr_{0.005}O_{1.9924}F_{0.0076}$.

The specific surface area of the powder after firing measured using the nitrogen adsorption method of the powder was 0.35 m$^2$/g, and the average particle diameter D50 measured using a laser scattering type particle-size distribution analyzer was 12.7 μm. Magnesium and zirconium were present on the surface. As a result of observation through SEM, 30 or more primary particles were coagulated to form a secondary particle in the obtained positive electrode active material powder.

The initial discharge capacity at 25° C., 2.75 to 4.5 V, and a discharge rate of 0.5 C was 189.1 mAh/g, and the average voltage was 4.011 V. The capacity retention after 50 times of charge-discharge cycles was 91.6%.

Example 5

A positive electrode active material was synthesized in the same manner as in Example 1 except that hafnium oxide powders were used in lieu of using zirconium oxide, and composition analyses, property measurements, and cell performance tests were carried out. As a result thereof, the composition was $LiCo_{0.99}Al_{0.005}Hf_{0.005}O_2$.

The specific surface area of the powder after firing measured using the nitrogen adsorption method of the powder was 0.39 m$^2$/g, and the average particle diameter D50 measured using a laser scattering type particle-size distribution analyzer was 12.2 μm. Aluminum and hafnium were present on the surface. As a result of observation through SEM, 30 or more primary particles were coagulated to form a secondary particle in the obtained positive electrode active material powder.

The initial discharge capacity at 25° C., 2.75 to 4.5 V, and a discharge rate of 0.5 C was 190.4 mAh/g, and the average voltage was 4.029 V. The capacity retention after 50 times of charge-discharge cycles was 88.0%.

Example 6

A positive electrode active material was synthesized in the same manner as in Example 5 except that magnesium hydroxide was used in lieu of using aluminum hydroxide, and composition analyses, property measurements, and cell performance tests were carried out. As a result thereof, the composition was $LiCo_{0.99}Mg_{0.005}Hf_{0.005}O_2$.

The specific surface area of the powder after firing measured using the nitrogen adsorption method of the powder was 0.41 m$^2$/g, and the average particle diameter D50 measured using a laser scattering type particle-size distribution analyzer was 12.4 μm. Magnesium and hafnium were present on the surface. As a result of observation through SEM, 30 or more primary particles were coagulated to form a secondary particle in the obtained positive electrode active material powder.

The initial discharge capacity at 25° C., 2.75 to 4.5 V, and a discharge rate of 0.5 C was 189 mAh/g, and the average voltage was 4.009 V. The capacity retention after 50 times of charge-discharge cycles was 90.5%.

Example 7

A positive electrode active material was synthesized in the same manner as in Example 1 except that titanium oxide powders were used in lieu of using zirconium oxide, and composition analyses, property measurements, and cell performance tests were carried out. As a result thereof, the composition was $LiCo_{0.99}Al_{0.005}Ti_{0.005}O_2$.

The specific surface area of the powder after firing measured using the nitrogen adsorption method of the powder was 0.41 m$^2$/g, and the average particle diameter D50 measured using a laser scattering type particle-size distribution analyzer was 12.1 μm. Aluminum and titanium were present on the surface. As a result of observation through SEM, 30 or more primary particles were coagulated to form a secondary particle in the obtained positive electrode active material powder.

The initial discharge capacity at 25° C., 2.75 to 4.5 V, and a discharge rate of 0.5 C was 187.6 mAh/g, and the average voltage was 4.008 V. The capacity retention after 50 times of charge-discharge cycles was 88.2%.

Example 8

A positive electrode active material was synthesized in the same manner as in Example 7 except that magnesium hydroxide was used in lieu of using aluminum hydroxide, and composition analyses, property measurements, and cell performance tests were carried out. As a result thereof, the composition was $LiCo_{0.99}Mg_{0.005}Ti_{0.005}O_2$.

The specific surface area of the powder after firing measured using the nitrogen adsorption method of the powder was 0.43 m$^2$/g, and the average particle diameter D50 measured using a laser scattering type particle-size distribution analyzer was 12.0 μm. Magnesium and titanium were present on the surface. As a result of observation through SEM, 30 or more primary particles were coagulated to form a secondary particle in the obtained positive electrode active material powder.

The initial discharge capacity at 25° C., 2.75 to 4.5 V, and a discharge rate of 0.5 C was 187.3 mAh/g, and the average voltage was 4.005 V. The capacity retention after 50 times of charge-discharge cycles was 86.5%.

Example 9

A positive electrode active material was synthesized in the same manner as in Example 1 except that the quantities of aluminum hydroxide and zirconium oxide were changed, and composition analyses, property measurements, and cell performance tests were carried out. As a result thereof, the composition was $LiCo_{0.98}Al_{0.01}Zr_{0.01}O_2$.

The specific surface area of the powder after firing measured using the nitrogen adsorption method of the powder was 0.39 m$^2$/g, and the average particle diameter D50 measured using a laser scattering type particle-size distribution analyzer was 12.6 μm. Magnesium and titanium were present on the surface. As a result of observation through SEM, 30 or more primary particles were coagulated to form a secondary particle in the obtained positive electrode active material powder.

The initial discharge capacity at 25° C., 2.75 to 4.5 V, and a discharge rate of 0.5 C was 185.3 mAh/g, and the average voltage was 4.022 V. The capacity retention after 50 times of charge-discharge cycles was 86.5%.

Example 10

A positive electrode active material was synthesized in the same manner as in Example 2 except that the quantities of magnesium hydroxide and zirconium oxide were changed, and composition analyses, property measurements, and cell performance tests were carried out. As a result thereof, the composition was $LiCo_{0.98}Mg_{0.01}Zr_{0.01}O_2$.

The specific surface area of the powder after firing measured using the nitrogen adsorption method of the powder was 0.35 m$^2$/g, and the average particle diameter D50 measured using a laser scattering type particle-size distribution analyzer was 12.8 μm. Magnesium and zirconium were present on the surface.

The initial discharge capacity at 25° C., 2.75 to 4.5 V, and a discharge rate of 0.5 C was 186.6 mAh/g, and the average voltage was 4.003 V. The capacity retention after 50 times of charge-discharge cycles was 87.1%.

Figure 2:
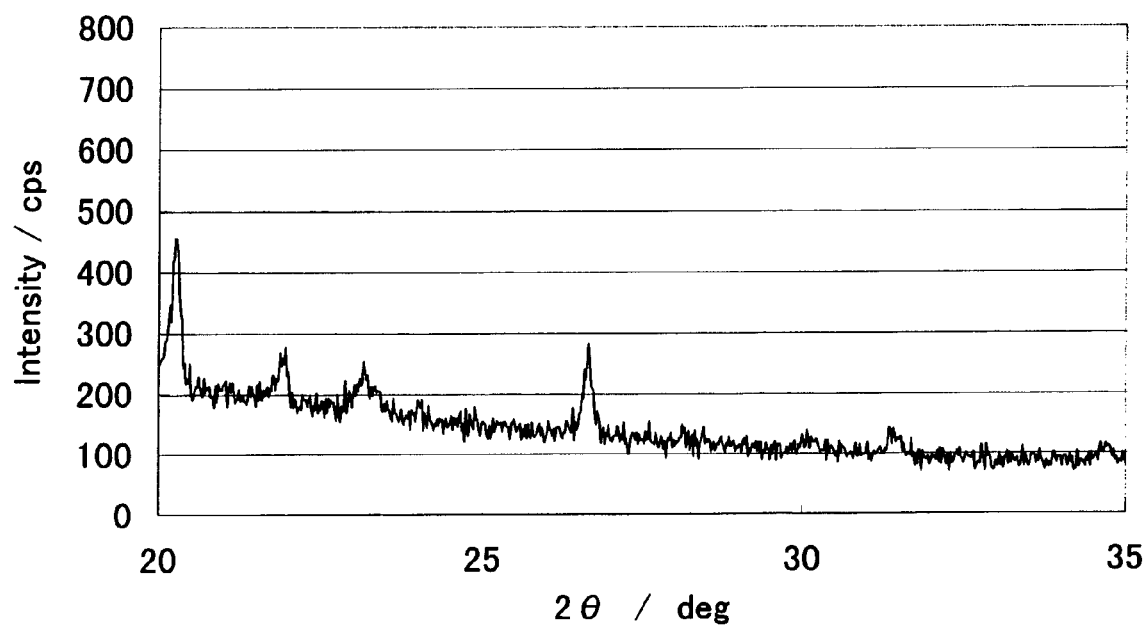
FIG. 2 is a graph showing an X-ray powder diffraction spectrum of the positive electrode active material obtained in Example 10.

In the same manner as in Example 2, the X-ray diffraction spectrum of the powder after firing was obtained by a high-sensitivity X-ray diffractometry using Cu—K α ray. The obtained spectrum is shown in FIG. 2. From FIG. 2, no diffraction spectrum at 2 θ of 28±1° was observed, and it was found that zirconium was not present as a single-component oxide.

It was also found from the analysis of the X-ray diffraction spectrum that about 90% of the zirconium formed a solid solution with cobalt, and about 10% thereof was present as $Li_2ZrO_3$. As a result of observation through SEM, 30 or more primary particles were coagulated to form a secondary particle in the obtained positive electrode active material powder.

Example 11

A positive electrode active material was synthesized in the same manner as in Example 2 except that cobalt hydroxide having an average particle diameter D 50 of 12.7 μm, wherein 100 or more primary particles were coagulated to form a secondary particle, was used as a cobalt source in lieu of cobalt oxyhydroxide, and composition analyses, property measurements, and cell performance tests were carried out. As a result thereof, the composition was $LiCo_{0.99}Mg_{0.005}Zr_{0.005}O_2$.

The specific surface area of the powder after firing measured using the nitrogen adsorption method of the powder was 0.43 m$^2$/g, and the average particle diameter D50 measured using a laser scattering type particle-size distribution analyzer was 14.8 µm. Magnesium and zirconium were present on the surface.

The initial discharge capacity at 25° C., 2.75 to 4.5 V, and a discharge rate of 0.5 C was 190.0 mAh/g, and the average voltage was 4.013 V. The capacity retention after 50 times of charge-discharge cycles was 93.3%.

In the same manner as in Example 2, the X-ray diffraction spectrum of the powder after firing was obtained by a high-sensitivity X-ray diffractometry using Cu—K α ray. As a result, no diffraction spectrum at 2 θ of 28±1° was observed, and it was found that zirconium was not present as a single-component oxide.

As a result of observation through SEM, 30 or more primary particles were coagulated to form a secondary particle in the obtained positive electrode active material powder. The packing properties of the electrode layer using the positive electrode active material powders synthesized in Example 11 were better than those of Example 2.

Comparative Example 1

A positive electrode active material was synthesized in the same manner as in Example 1 except that aluminum hydroxide and zirconium oxide were not used; and composition analyses, property measurements, and cell performance tests were carried out. As a result thereof, the composition was $LiCoO_2$.

The specific surface area of the powder after firing measured using the nitrogen adsorption method of the powder was 0.32 m$^2$/g, and the average particle diameter D50 measured using a laser scattering type particle-size distribution analyzer was 13.3 µm.

The initial discharge capacity at 25° C., 2.75 to 4.5 V, and a discharge rate of 0.5 C was 194.5 mAh/g, and the average voltage was 4.008 V. The capacity retention after 50 times of charge-discharge cycles was 74.4%. The heat-generation starting temperature of the 4.3-V charged material was 163° C.

Comparative Example 2

A positive electrode active material was synthesized in the same manner as in Example 1 except that zirconium oxide was not used; and composition analyses, property measurements, and cell performance tests were carried out. As a result thereof, the composition was $LiCo_{0.99}Al_{0.01}O_2$.

The specific surface area of the powder after firing measured using the nitrogen adsorption method of the powder was 0.32 m$^2$/g, and the average particle diameter D50 measured using a laser scattering type particle-size distribution analyzer was 13.4 µm. Aluminum was present on the surface.

The initial discharge capacity at 25° C., 2.75 to 4.5 V, and a discharge rate of 0.5 C was 189.0 mAh/g, and the average voltage was 4.016 V. The capacity retention after 50 times of charge-discharge cycles was 84.2%.

Comparative Example 3

A positive electrode active material was synthesized in the same manner as in Example 2 except that zirconium oxide was not used; and composition analyses, property measurements, and cell performance tests were carried out. As a result thereof, the composition was $LiCo_{0.99}Mg_{0.01}O_2$.

The specific surface area of the powder after firing measured using the nitrogen adsorption method of the powder was 0.29 m$^2$/g, and the average particle diameter D50 measured using a laser scattering type particle-size distribution analyzer was 13.3 µm. Magnesium was present on the surface.

The initial discharge capacity at 25° C., 2.75 to 4.5 V, and a discharge rate of 0.5 C was 190.1 mAh/g, and the average voltage was 3.980 V. The capacity retention after 50 times of charge-discharge cycles was 74.7%.

Comparative Example 4

A positive electrode active material was synthesized in the same manner as in Example 1 except that aluminum hydroxide was not used; and composition analyses, property measurements, and cell performance tests were carried out. As a result thereof, the composition was $LiCo_{0.99}Zr_{0.01}O_2$.

The specific surface area of the powder after firing measured using the nitrogen adsorption method of the powder was 0.41 m$^2$/g, and the average particle diameter D50 measured using a laser scattering type particle-size distribution analyzer was 13.0 µm. Zirconium was present on the surface.

The initial discharge capacity at 25° C., 2.75 to 4.5 V, and a discharge rate of 0.5 C was 186.4 mAh/g, and the average voltage was 4.022 V. The capacity retention after 50 times of charge-discharge cycles was 66.4%.

Figure 3:
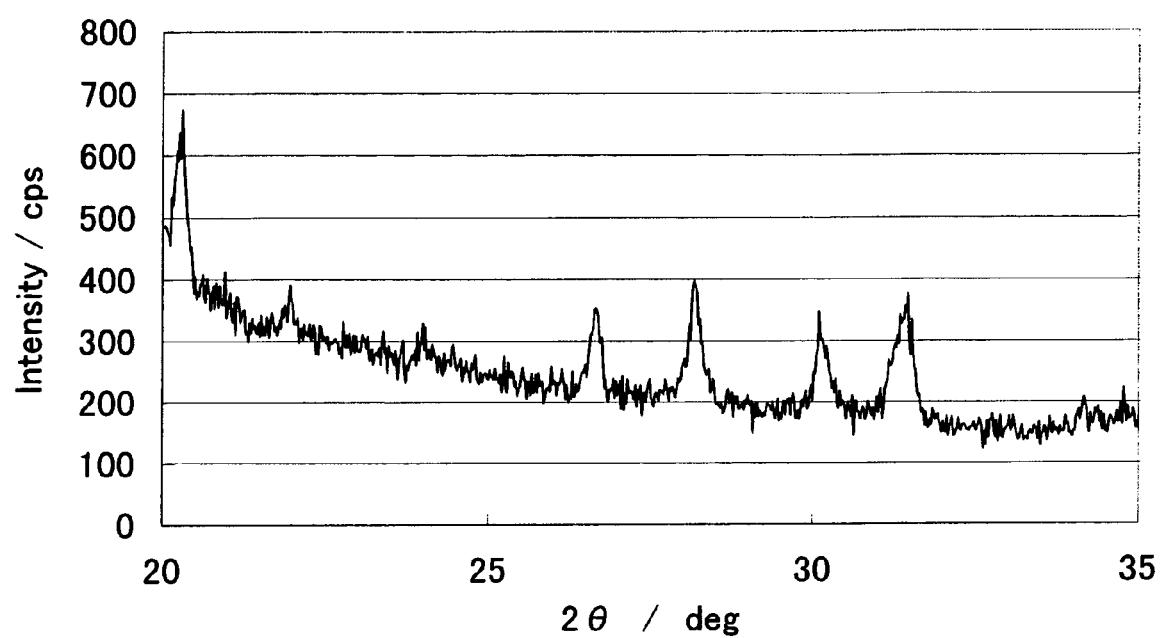
FIG. 3 is a graph showing an X-ray powder diffraction spectrum of the positive electrode active material obtained in Comparative Example 4.

In the same manner as in Example 2, the X-ray diffraction spectrum of the powder after firing was obtained by a high-sensitivity X-ray diffractometry using Cu—K α ray. The obtained spectrum is shown in FIG. 3. From FIG. 3, diffraction spectrum at 2 θ of 28±1° were significantly observed, and it was found that about 40% of zirconium was present as a single-component oxide. It was also found from the analysis of the X-ray diffraction spectrum that about 50% of the zirconium formed a solid solution with cobalt, and about 10% thereof was present as $Li_2ZrO_3$.

Comparative Example 5

A positive electrode active material was synthesized in the same manner as in Example 5 except that aluminum hydroxide was not used; and composition analyses, property measurements, and cell performance tests were carried out. As a result thereof, the composition was $LiCo_{0.99}Hf_{0.01}O_2$.

The specific surface area of the powder after firing measured using the nitrogen adsorption method of the powder was 0.43 m$^2$/g, and the average particle diameter D50 measured using a laser scattering type particle-size distribution analyzer was 11.7 µm. Hafnium was present on the surface.

The initial discharge capacity at 25° C., 2.75 to 4.5 V, and a discharge rate of 0.5 C was 190.4 mAh/g, and the average voltage was 4.027 V. The capacity retention after 50 times of charge-discharge cycles was 82.7%.

Comparative Example 6

A positive electrode active material was synthesized in the same manner as in Example 8 except that magnesium hydroxide was not used; and composition analyses, property measurements, and cell performance tests were carried out. As a result thereof, the composition was $LiCo_{0.99}Ti_{0.01}O_2$.

The specific surface area of the powder after firing measured using the nitrogen adsorption method of the powder was 0.50 m²/g, and the average particle diameter D50 measured using a laser scattering type particle-size distribution analyzer was 12.7 μm. Titanium was present on the surface.

The initial discharge capacity at 25° C., 2.75 to 4.5 V, and a discharge rate of 0.5 C was 186.4 mAh/g, and the average voltage was 4.020 V. The capacity retention after 50 times of charge-discharge cycles was 78.3%.

Comparative Example 7

A positive electrode active material was synthesized in the same manner as in Example 3 except that aluminum hydroxide and zirconium oxide were not used; and composition analyses, property measurements, and cell performance tests were carried out. As a result thereof, the composition was $LiCoO_{1.9924}F_{0.0076}$.

The specific surface area of the powder after firing measured using the nitrogen adsorption method of the powder was 0.33 m²/g, and the average particle diameter D50 measured using a laser scattering type particle-size distribution analyzer was 13.2 μm. Fluorine was present on the surface.

The initial discharge capacity at 25° C., 2.75 to 4.5 V, and a discharge rate of 0.5 C was 192.6 mAh/g, and the average voltage was 4.012 V. The capacity retention after 50 times of charge-discharge cycles was 78.2%.

Comparative Example 8

A positive electrode active material was synthesized in the same manner as in Example 1 except that the quantities of aluminum hydroxide and zirconium oxide were changed; and composition analyses, property measurements, and cell performance tests were carried out. As a result thereof, the composition was $LiCo_{0.96}Al_{0.02}Zr_{0.02}O_2$.

The specific surface area of the powder after firing measured using the nitrogen adsorption method of the powder was 0.44 m²/g, and the average particle diameter D50 measured using a laser scattering type particle-size distribution analyzer was 11.9 μm. Aluminum and zirconium were present on the surface.

The initial discharge capacity at 25° C., 2.75 to 4.5 V, and a discharge rate of 0.5 C was 181.9 mAh/g, and the average voltage was 4.021 V. The capacity retention after 50 times of charge-discharge cycles was 83.3%.

INDUSTRIAL APPLICABILITY

According to the present invention, as described above, there is provided a material of a positive electrode for a secondary lithium-ion cell having high cycle durability and high safety for high-voltage and high-capacity uses, which are useful for secondary lithium-ion cells.

The invention claimed is:

1. A material of a positive electrode for a secondary lithium cell, comprising a particulate active material of positive electrode for a secondary lithium-ion cell represented by a general formula, $Li_aCo_bA_cB_dO_eF_f$, wherein A is Al or Mg, B is a group-IV transition element, $0.90 \leq a \leq 1.10$, $0.97 \leq b \leq 1.00$, $0.0001 \leq c \leq 0.03$, $0.0001 \leq d \leq 0.03$, $1.98 \leq e \leq 2.02$, $0 < f \leq 0.02$, and $0.002 \leq c+d \leq 0.02$, said element A, element B and fluorine are evenly present in a vicinity of particle surfaces; a single-component oxide of said element B is 20% or less; and no diffraction peaks are observed at 2θ of 28±1° in a high-sensitivity X-ray diffraction spectrum using Cu-Kα ray.

2. The material of a positive electrode for a secondary lithium cell according to claim 1, wherein at least a part of said element represented by A or B contained in said particulate active material of the positive electrode for the secondary lithium-ion cell has substituted for cobalt atoms in the particles to form a solid solution.

3. The material of a positive electrode for a secondary lithium cell according to claim 1, wherein the atomic ratio of said element A to said element B is $0.33 \leq c/d \leq 3.00$, provided that $0.002 \leq c+d \leq 0.02$.

4. The material of a positive electrode for a secondary lithium cell according to claim 1, wherein said particulate active material of the positive electrode for the secondary lithium-ion cell consists of secondary particles each formed by coagulation of 10 or more primary particles, and an average particle diameter of said secondary particle is from 2 to 20 μm.

* * * * *